Figure 3:
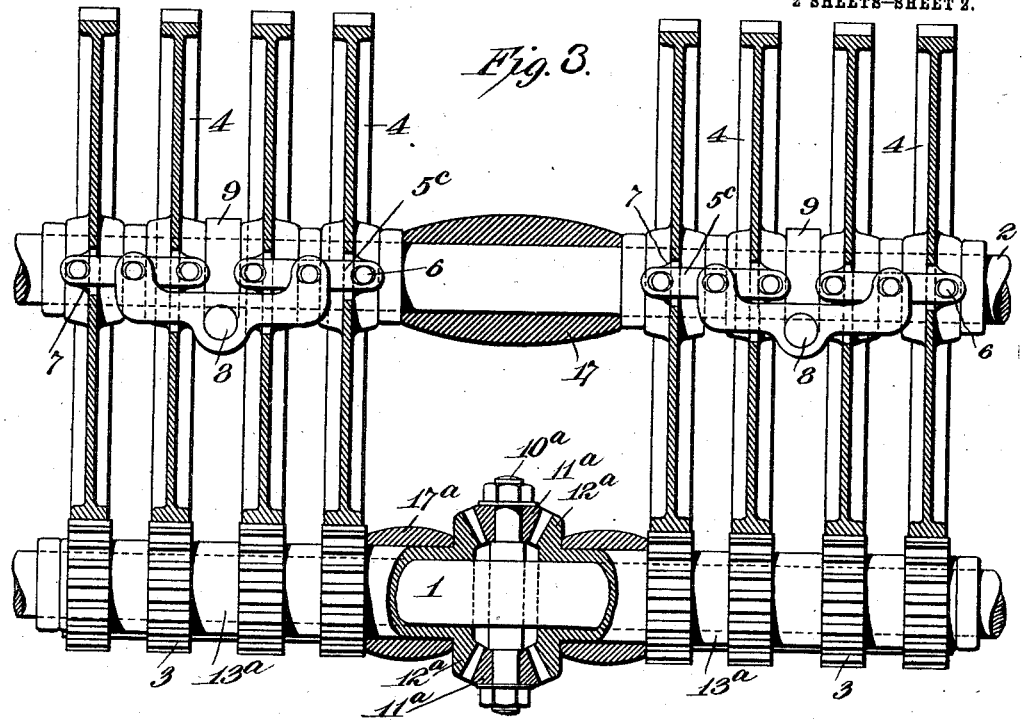

C. G. CURTIS.
GEARING.
APPLICATION FILED NOV. 23, 1909.
1,078,837.
Patented Nov. 18, 1913.
2 SHEETS—SHEET 1.
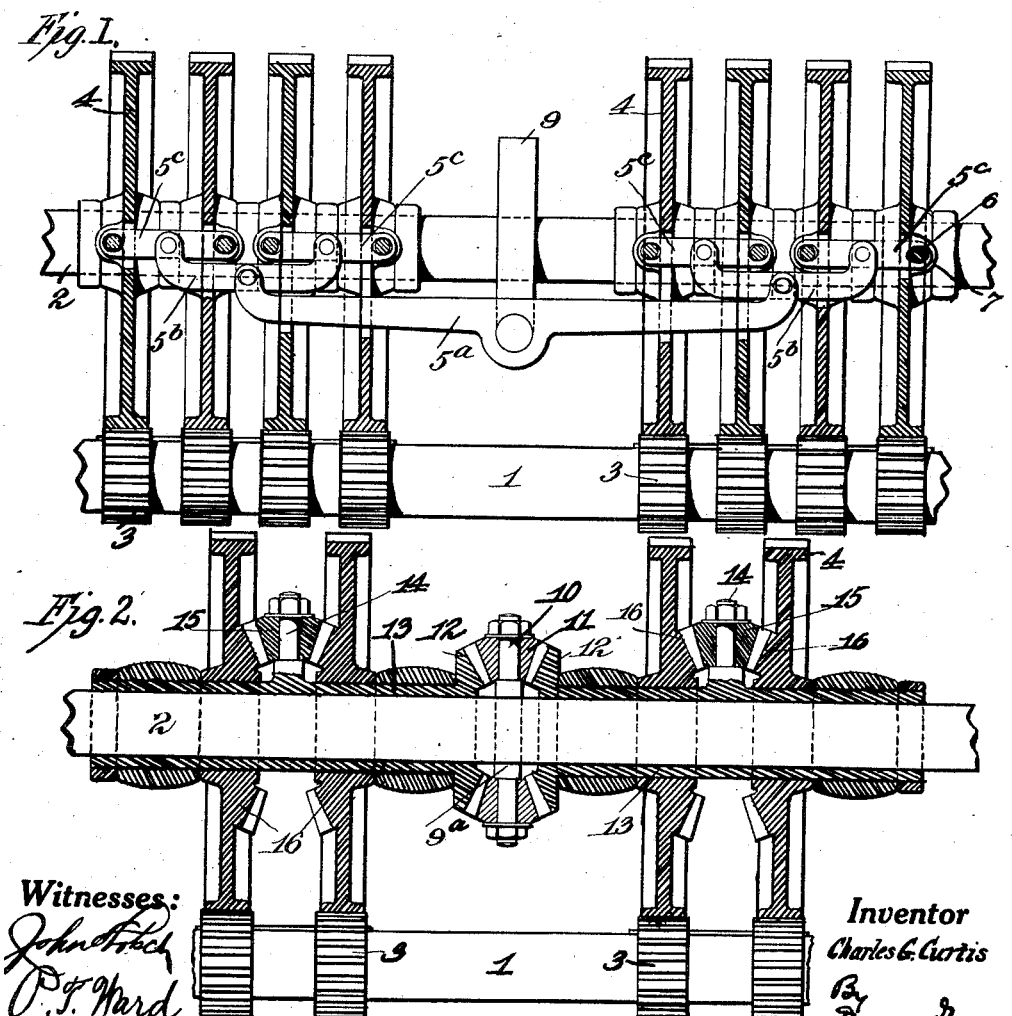
Witnesses:
John French
O. T. Ward
Inventor
Charles G. Curtis
By
Dyer & Dyer
Attorneys.

C. G. CURTIS.
GEARING.
APPLICATION FILED NOV. 23, 1909.

1,078,837.

Patented Nov. 18, 1913.

2 SHEETS—SHEET 2.

Witnesses:

Inventor
Charles G. Curtis
By [signature]
Attorneys.

UNITED STATES PATENT OFFICE.

CHARLES G. CURTIS, OF NEW YORK, N. Y.

GEARING.

1,078,837. Specification of Letters Patent. Patented Nov. 18, 1913.

Application filed November 23, 1909. Serial No. 529,513.

*To all whom it may concern:*

Be it known that I, CHARLES G. CURTIS, a citizen of the United States, residing in the borough of Manhattan, city and State of New York, have invented a certain new and useful Improvement in Gearing, of which the following is a specification.

The object of my invention is to produce a mechanical gearing for transmitting heavy loads. One use of my invention is in connection with marine propulsion,—particularly with steam turbines or high speed engines in which the shaft speed should be higher than the propeller shaft speed and in which the load to be transmitted is much larger than can be transmitted by ordinary gears but the invention is not limited to such use. Ordinary gears used in the usual manner to transmit heavy loads have been unsuccessful. The lack of success may be attributed to a number of causes, one of which is that the load on the teeth of the gear wheel increases at a greater rate than the increase of size or wearing surface of the teeth. To transmit a heavy load, with ordinary gears, it would be necessary to make the gear faces enormously long, which is impossible, as the greatest width of the gear which can be used is limited for practical reasons. It is impossible to make two intermeshing gears of sufficient length of tooth face to carry the enormous load necessary in modern marine propulsion and for other heavy duty, and at the same time have them equally engage. So also it is impossible to use a number of gears keyed upon two shafts for the reason that there will be inequalities in alinement so the gears will not carry their true proportion of the load.

According to my invention, I seek to make practical the connection of two shafts by means of spur gears, using a plurality of gears on each shaft and distributing the load equally among them.

My invention may be carried out in many ways, those illustrated in the drawings representing only a few embodiments of the invention.

In the drawings, Figure 1 is a view partly in section of the gearing having eight pairs of gears with means for distributing the load in accordance with my invention. Fig. 2 is a similar view showing a method of distributing the load between four pairs of gears; and Fig. 3 is a similar view illustrating a method of distributing the load between eight pairs of gears.

In Fig. 1 the shafts connected by the gearing are indicated by 1 and 2. The shaft 1 carries eight pinions 3. These pinions mesh with eight gear wheels 4, mounted loosely on shaft 2. The gear wheels 4 are connected together in pairs by primary equalizers $5^c$, these being bars which connect pivots 6 on the two wheels. The primary equalizing bars of two adjacent pairs are connected together by secondary equalizing bars $5^b$, which are pivoted to the primary equalizing bars, and the secondary equalizing bars are connected together by a tertiary equalizing bar $5^a$, which is pivoted to a disk 9 fixed upon shaft 2. It will be observed that the primary equalizing bars permit relative circumferential self-adjustment of the two gears which they connect; that the secondary equalizing bars perform this office for the two pairs of gears which they connect; while the tertiary equalizing bar performs the same office for the two groups of wheels which it connects. Within the limits of circumferential self-adjustment permitted by the equalizers an equal distribution of the load between all the gears is effected.

In Fig. 2 a modified arrangement, involving four pairs of spur gears and equalizers of somewhat different form, is shown. In this arrangement, the shaft 1 carries four pinions 3, while the shaft 2 carries four gear wheels 4. The gear wheels are mounted loosely upon sleeves 13, having bevel gears 12 at their adjoining ends, which bevel gears are connected together by pinions 11 mounted upon studs $9^a$ and 10 secured to the shaft 2. The sleeves 13 and their bevel gear connection with the shaft 2 form the secondary equalizer, the primary equalizers being formed by bevel pinions 15 mounted on studs 14 carried by the sleeves 13, and meshing with bevel gear teeth 16 on the sides of the hubs of adjoining gear wheels 4.

The four-wheel arrangement of Fig. 2 presents an embodiment of my invention which might be employed for reducing speed and transmitting heavy loads, such as one or two thousand horse power, but for transmitting the greater loads involved in marine propulsion by steam turbines a larger number of pairs of wheels would have to be employed, such as is shown in Figs. 1 and 3.

In Fig. 3 an arrangement similar to Fig. 1 is illustrated, in which, however, the tertiary equalization between the two groups of wheels is effected by means located on the pinion shaft 1. In this construction, the secondary equalizers are connected at their centers with the shaft 2. The pinions 3, however, on the shaft 1, are divided into two groups of four each, mounted upon sleeves 13$^a$, which are connected together and with the shaft at their adjoining ends by bevel pinions 11$^a$ mounted on studs 10$^a$ from the shaft 1, and meshing with bevel gears 12$^a$ on the adjacent ends of the sleeves 13$^a$. It is apparent that various arrangements of the equalizing devices can be used, and that they may be connected either with the smaller or larger gears, or both. It is also apparent that as to adjoining gears which have no relative circumferential movement, such as the groups of pinions 3 on the shaft 1 of Figs. 1 and 2, the gears need not be separate, but may be single gears with teeth long enough to engage the several separate gears of the other elements of the gearing.

From the foregoing description, it will be apparent that the equalizing device permits the equalizing of the position of the gears in a circumferential direction, so that within the limits of circumferential self-adjustment permitted, the teeth of the several gears will properly engage, and each gear will carry its due proportion of the load. I do not wish to be limited to any one kind of equalizing device, as any device or means which permits the gears to circumferentially move when under load so that the load is distributed and equalized, or substantially equalized, within the limits of adjustment, can be used.

What I claim is:

1. In a gearing for transmitting heavy loads, the combination with two shafts, of four or more pairs of intermeshing tooth gears mounted on said shafts and transmitting motion from one shaft to the other and means enabling relative circumferential self-adjustment of the several pairs of gears to distribute the load, substantially as set forth.

2. In a gearing for transmitting heavy loads, the combination with two shafts, of four or more pairs of intermeshing tooth gears transmitting motion from one shaft to the other and equalizing devices enabling relative circumferential self-adjustment of the several pairs of gears to distribute the load, substantially as set forth.

3. The combination with two shafts, multiple gears on each shaft meshing with the gears on the other shaft, and an equalizing device on each shaft enabling relative circumferential self-adjustment of the gears to distribute the load, substantially as set forth.

4. The combination of eight or more pairs of gears and two shafts connected by said gears in multiple, of means for substantially equalizing the load between the several pairs of gears, substantially as set forth.

5. The combination with a shaft, of four gears mounted loosely thereon, primary equalizers connecting adjoining gears, a secondary equalizer connecting the primary equalizers and means for connecting the secondary equalizers with the shaft, substantially as set forth.

6. The combination with a shaft, of eight gears mounted loosely thereon, primary equalizers connecting adjoining gears, secondary equalizers connecting adjoining primary equalizers and means for equalizing the load between the two groups of wheels connected by the secondary equalizers, substantially as set forth.

7. The combination with two shafts, of two groups of gear wheels on each shaft, each group comprising a plurality of wheels, equalizers connecting the wheels of each group together and to the shaft and an equalizer on the other shaft between the two groups of wheels, substantially as set forth.

This specification signed and witnessed this 22nd day of Nov., 1909.

CHARLES G. CURTIS.

Witnesses:
LEONARD H. DYER,
JOHN L. LOTSCH.